(12) United States Patent
Wellwood et al.

(10) Patent No.: US 9,764,258 B2
(45) Date of Patent: Sep. 19, 2017

(54) CONTROLLING FROTH FLOTATION

(75) Inventors: Grant Ashley Wellwood, Pheasant Creek (AU); Damien Harding, Clifton Hill (AU); Andrew Thornton, Hendra (AU); Bruce Northway, Hendra (AU); Kevin Kropf, Hendra (AU)

(73) Assignee: Technological Resources Pty. Limited, Melbourne (AU)

( * ) Notice: Subject to any disclaimer, the term of this patent is extended or adjusted under 35 U.S.C. 154(b) by 0 days.

(21) Appl. No.: 13/885,819

(22) PCT Filed: Nov. 16, 2011

(86) PCT No.: PCT/AU2011/001480
§ 371 (c)(1),
(2), (4) Date: Aug. 2, 2013

(87) PCT Pub. No.: WO2012/065221
PCT Pub. Date: May 24, 2012

(65) Prior Publication Data
US 2013/0306571 A1    Nov. 21, 2013

(30) Foreign Application Priority Data
Nov. 16, 2010    (AU) ................ 2010905081

(51) Int. Cl.
*B03D 1/02*    (2006.01)
*B01D 21/34*    (2006.01)
*B01D 21/00*    (2006.01)
*B03D 1/14*    (2006.01)

(52) U.S. Cl.
CPC ......... *B01D 21/34* (2013.01); *B01D 21/0084* (2013.01); *B03D 1/028* (2013.01); *B03D 1/02* (2013.01); *B03D 1/14* (2013.01)

(58) Field of Classification Search
USPC ............................................ 209/1, 164, 166
See application file for complete search history.

(56) References Cited

U.S. PATENT DOCUMENTS

| 5,962,828 A | 10/1999 | Hughes |
| 2009/0255876 A1* | 10/2009 | Dunbar ................. C02F 1/008 210/709 |
| 2010/0276342 A1 | 11/2010 | LeRoux Cilliers |

FOREIGN PATENT DOCUMENTS

| WO | WO 2004/080600 A1 * | 9/2004 |
| WO | WO2009044149 A1 | 4/2009 |

OTHER PUBLICATIONS

Hoffman et al., "Calculus" 8th ediition, Mcgraw Hill publishing, Copyright @2004, p. 157, and 184-195.*
Newton's method of optimization, Wikipedia, Sep. 4, 2014.*
International Search Report mailed Feb. 13, 2012 (PCT/AU2011/001480); ISA/AU.

* cited by examiner

*Primary Examiner* — Thomas M Lithgow
(74) *Attorney, Agent, or Firm* — Bauer & Witcoff, Ltd.

(57) ABSTRACT

A method of controlling a froth flotation cell in a froth flotation circuit for separating substances comprises periodically carrying out a control routine to maximize froth stability during the operation of the cell. The control routine comprises changing the gas flow rate to the cell in a series of steps and assessing the froth stability at each gas flow rate and continuing the step changes in the gas flow rate until the froth stability is a peak froth stability or is within a predetermined range of the peak froth stability of the cell.

17 Claims, 5 Drawing Sheets

CONTROLLING FROTH FLOTATION

The present application is a U.S. National Phase filing of International Application No. PCT/AU2011/001480, filed on Nov. 16, 2011, designating the United States of America and claiming priority to Australia Patent Application No. 2010905081, filed Nov. 16, 2010, and this application claims priority to and the benefit of both the above-identified applications, which are both incorporated by reference herein in their entireties.

The present invention relates to a method of controlling one or more than one flotation cell for separating substances in a feed material in a froth flotation circuit.

The present invention relates particularly, although by no means exclusively, to a method of controlling one or more than one flotation cell in a froth flotation circuit for separating substances, for example minerals containing valuable material such as valuable metals such as nickel and copper, from a feed material in the form of an ore that contains the minerals and other material (hereinafter referred to as "gangue").

The following description of the invention focuses on a froth flotation method for separating particles of valuable minerals from particles of gangue in a feed material in the form of mined ores, but the invention is not confined to this application.

Froth flotation is a process for separating valuable minerals from gangue by taking advantage of hydrophobicity differences between valuable minerals and waste gangue in a feed material. The purpose of froth flotation is to produce a concentrate that has a higher grade, i.e. a higher product grade, of a valuable material (such as copper) than the grade of the valuable material in the feed material. Performance is normally controlled through the addition of surfactants and wetting agents to an aqueous slurry of particles of the minerals and gangue contained in a flotation cell. These chemicals condition the particles and stabilise the froth phase. For each system (ore type, size distribution, water, gas etc), there is an optimum reagent type and dosage level. Once the surface of the solid phases has been conditioned they are then selectively separated with a froth that is created by supplying a flotation gas, such as air, to the process. A concentrate of the minerals is produced from the froth. Like the chemical additives, the separation gas used to generate the froth is a process reagent with an optimum dosage level. The optimum dose of gas is a complex function of many system and equipment factors but for a given flotation cell can be determined empirically by maximising the gas recovery point for the cell.

The performance quality of a flotation process can be measured with respect to two characteristics of a concentrate that is extracted from a flotation cell—namely product grade and product recovery. Product grade indicates the fraction of a valuable material in the concentrate as compared to the remainder of the material in the concentrate. Product recovery indicates the fraction of the valuable material in the concentrate as compared to the total amount of the valuable material in the original feed material that was supplied to the flotation cell.

A key aim of an industrial flotation process is to control operating conditions in order to achieve an optimal balance between grade and recovery, with an ideal flotation process producing high recovery of high grade concentrate.

International publication WO 2009/044149 in the name of Imperial Innovations Limited relates to an invention of a method of controlling operation of a froth flotation cell that forms part of a froth flotation circuit. The method is based on controlling flotation gas flow rate into a cell so that the cell operates at maximum gas recovery for the cell.

The maximum gas recovery for a cell is described as the "peak gas recovery" and the gas flow rate at the peak gas recovery is described as the "peak gas rate". In a situation in which the flotation gas is air, the maximum gas recovery is described as the "peak air recovery" and the air flow rate at the peak air recovery is described as the "peak air rate".

The paragraph commencing on page 4, line 17 of the International publication defines the term "gas recovery for the cell" to be "a measure of the volume of air or other flotation gas in froth bubbles that overflow from a flotation cell as compared to the volume of air or other flotation gas in bubbles that burst within the cell and/or to the volume of air or other flotation gas introduced into the cell during a flotation process".

The International publication describes that there is a correlation between operating a flotation cell to maximise gas recovery and maximising concentrate grade and concentrate recovery. In particular, the International publication describes that maximum gas recovery, i.e. peak gas recovery, coincides with optimum metallurgical performance, where metallurgical performance includes concentrate grade and concentrate recovery.

The International publication states that:

"By maximising gas recovery in the cell the cell produces a high grade of concentrate from the froth which overflows the cell, whilst also obtaining a high recovery of the desired mineral to be recovered from the ore by the froth flotation process. In particular, in the context of mineral separation from ore, controlling operation of a froth flotation cell according to gas recovery considerations minimises the amount of gangue present in the concentrate, which improves performance with respect to both the grade and recovery of the concentrate."

The International publication also states that:

"In overview, a method is provided for controlling operation of one or more froth flotation cells. In operation, air or other suitable flotation gas (including gas mixtures), such as nitrogen, is introduced into a froth flotation cell containing a slurry of a liquid and solid particles of an ore (including minerals containing valuable metal to be recovered) in order to create a froth. Overflow of the froth from the cell is then observed from which the air recovery (described above in more general terms as gas recovery) for the cell under the present operating conditions can be measured or inferred by appropriate method. The operation of the cell is controlled by varying the input air flow in order to maximise gas recovery."

The International publication also states that:

"Gas recovery can be calculated from any one or more of the following measurements: the height of the froth overflowing a flotation cell, obtained for example by measuring the height of the tide mark on a scaled vertical surface perpendicular to the overflow lip; the velocity of the froth overflowing the cell, obtained via image analysis of a flotation cell in operation; the length or perimeter of the cell from which the froth overflows, known to the user from plant measurements; and the gas flow rate into the cell, which is controlled by the user. Each of these measurements can therefore either be pre-determined by the user or can be calculated using image analysis. As a result, gas recovery can be monitored, measured and controlled in a non-intrusive manner, without touching the froth or other contents of the flotation cell. The methods of image analysis to be used and the calculations involved will be known to the skilled person and may be found, for example, in standard texts. No further detail on this point is therefore provided. As an alternative to measuring gas recovery directly as described above, gas recovery can be derived or inferred using, for example, a froth stability column."

The applicant has considered how to control a flotation cell and a froth flotation circuit that comprises a plurality of flotation cells to maximise gas recovery and, more particularly peak gas recovery in situations where the flotation gas is air.

The present invention is based on a realisation that it is not a straightforward exercise to continuously control the operation of such cells to maximise peak gas recovery. For example, variations in feed rate, solids composition, pulp pH, and chemical dosage rates can have a significant impact on the stability of cells.

The present invention is also based on a realisation that determining a peak gas rate for a cell by continuously adjusting the gas flow rate to the cell and calculating the gas recovery of the cell as a function of the gas flow rate is not necessarily a viable option. For example, a gas flow rate adjustment changes the performance of the cell and downstream cells. In addition, gas flow rate adjustment changes take time for the change to take effect. It takes time for froth behaviour (stability) to change. Hence, when a change to gas flow rate is made, time is required for the change to take effect and for monitoring gas recovery/froth stability to commence again and for successively repeating these steps. The waiting time depends on the residence time in the cell.

The present invention is also based on a realisation that peak gas recovery for a cell coincides with a maximum froth stability (i.e. a peak froth stability) for the cell and that the peak froth stability is what drives the peak gas recovery.

The term "froth stability" is understood herein to mean the ability of bubbles in a froth to resist coalescence and bursting.

According to the present invention there is provided a method of controlling a froth flotation cell in a froth flotation circuit for separating substances, the method comprising periodically carrying out a control routine to maximise froth stability during the operation of the cell, the control routine comprising changing the gas flow rate to the cell in a series of steps and assessing the froth stability at each gas flow rate and continuing the step changes in the gas flow rate until the froth stability is a peak froth stability or is within a predetermined range of the peak froth stability of the cell.

The change in the gas flow rate in each step may be based on the change or the rate of change of the froth stability in previous steps.

The predetermined range of the peak froth stability of the cell may be within 15%, typically within 10%, above or below the peak froth stability of the cell. This feature recognises that, in a number of situations, it is difficult to control gas flow rate to maintain froth stability at the peak froth stability and that effective control can be achieved by controlling froth stability to be close to the peak froth stability.

The assessment of froth stability at each flow rate may be made by assessing any one or more of bubble collapse rate in froth in the cell, bubble coalescence rate in froth in the cell, and gas recovery for the cell.

The assessment of bubble collapse rate in froth in the cell may be made by measuring bubble collapse rate visually or by an instrument in froth in the cell.

The assessment of bubble coalescence rate in froth in the cell may be made by measuring bubble coalescence rate visually or by an instrument in froth in the cell.

The assessment of gas recovery for the cell may be via measurement of gas recovery or via measurement of other parameters that are indicative of gas recovery.

The control routine may be carried out at uniform or variable time intervals during the operation of the cell.

Variable time intervals may be appropriate under certain circumstances. For example, shorter time periods may be appropriate when there are significant changes to inputs of the cell.

The method may comprise carrying out the control routine after there has been at least a minimum change in an input to the cell. The selected input may be any one or more parameters that affect the air recovery or froth stability, such as feed rate, solids concentration in the feed, particle size distribution, pH, superficial gas velocity, chemical dosage rate, feed grade, feed type, and froth depth.

The method may comprise carrying out the control routine after there has been at least a minimum change in an output of the cell. The selected output may be any one or more than one of concentrate grade, concentrate recovery, gas recovery, and gas hold-up.

The term "gas hold-up" in understood herein to mean the volume of gas in a pulp zone of a flotation cell. The volume of gas reduces the pulp volume and therefore decreases the residence time available for flotation. The gas hold-up depends on the amount of gas added to the flotation cell and is a strong function of pulp viscosity.

The control routine may comprise monitoring differences in froth stability at different gas flow rates.

The control routine may comprise monitoring the rate of change of froth stability at different gas flow rates.

The series of steps in the control routine may comprise the following steps:
(a) assessing the froth stability at a current gas flow rate;
(b) changing the gas flow rate to the cell;
(c) assessing the froth stability at the changed gas flow rate and determining whether the froth stability has increased or decreased at this gas flow rate;
(d) subject to the assessment in step (c), increasing or decreasing the gas flow rate to the cell;
(e) assessing the froth stability at the changed gas flow rate and determining whether the froth stability has increased or decreased at this gas flow rate; and
(f) repeating steps (b) to (d) until it becomes apparent that the froth stability is the peak froth stability or within the predetermined range of the peak froth stability of the cell.

Steps (b) and (d) may comprise making a step change increase or decrease in gas flow rate to the cell.

The amount of the step change increase or decrease of the gas flow rate to the cell may be the same or may vary in successive steps of the method. For example, the amount of the increase or decrease may become smaller as the difference between the froth stabilities in successive steps decreases.

The term "gas flow rate" into the cell as used herein is understood to be interchangeable with the term "superficial gas velocity" within the cell.

The control routine may comprise assessing froth stability using visual observations of the cell (particularly the bubbles—for example, by looking at an upper surface of the cell and observing bubble bursts).

The visual observations may include taking images of the froth in a cell and analysing the images.

The control routine may comprise assessing froth stability using cell data for one or more than one parameter of the cell that is obtained directly or indirectly via instruments monitoring the operation of the cell.

The parameters may comprise any one or more of the following parameters:
(a) the volume of froth overflowing the cell relative to the gas volume entering the cell,
(b) the gas recovery in the cell (and noting that peak gas recovery corresponds to peak froth stability), and
(c) the gas hold-up in pulp in the cell.

The volumetric rate of froth overflowing a cell may be calculated from the froth depth over the lip of the cell multiplied by the velocity of froth overflowing the lip multiplied by the cell perimeter over which the froth is overflowing.

According to the present invention there is also provided a method of controlling a froth flotation circuit comprising a plurality of froth flotation cells for separating substances, the method comprising periodically carrying out a control routine to maximise froth stability during the operation of at least one cell in the froth flotation circuit, the control routine comprising changing the gas flow rate to the cell in a series of steps and assessing the froth stability at each gas flow rate and continuing the step changes in the gas flow rate until the froth stability is a peak froth stability or is within a predetermined range of the peak froth stability of the cell.

The change in the gas flow rate in each step may be based on the change or the rate of change of the froth stability in previous steps.

The predetermined range of the peak froth stability of the cell may be within 15%, typically within 10%, above or below the peak froth stability of the cell.

The assessment of froth stability at each flow rate may be made by assessing any one or more of bubble collapse rate in froth in the cell, bubble coalescence rate in froth in the cell, and gas recovery for the cell.

The assessment of bubble collapse rate in froth in the cell may be made by measuring bubble collapse rate visually or by an instrument in froth in the cell.

The assessment of bubble coalescence rate in froth in the cell may be made by measuring bubble coalescence rate visually or by an instrument in froth in the cell.

The assessment of gas recovery for the cell may be via measurement of gas recovery or via measurement of other parameters that are indicative of gas recovery.

The control routine may be carried out at uniform or variable time intervals during the operation of the cell.

Variable time intervals may be appropriate under certain circumstances. For example, shorter time periods may be appropriate when there are significant changes to inputs of the cell.

The method may comprise carrying out the control routine after there has been at least a minimum change in an input to the cell. The selected input may be any one or more parameters that affect the froth stability, such as feed rate, solids concentration in the feed, particle size distribution, pH, superficial gas velocity, chemical dosage rate, feed grade, feed type, and froth depth.

The method may comprise carrying out the control routine after there has been at least a minimum change in an output of the cell. The selected output may be any one or more than one of concentrate grade, concentrate recovery, gas recovery, and gas hold-up.

The method may comprise periodically carrying out the control routine in a selected cell in the froth flotation circuit to maximise froth stability of the selected cell and thereafter periodically carrying out the control routine in other cells in the froth flotation circuit.

The method may comprise periodically carrying out the control routine in all of the cells in the froth flotation circuit.

The method may comprise periodically carrying out the control routine in a selection of the cells in the froth flotation circuit.

The method may comprise periodically carrying out the control routine in the cells in a "rougher" bank of cells in the froth flotation circuit.

The method may comprise periodically carrying out the control routine in a selected cell in the froth flotation circuit to maximise froth stability of the selected cell and thereafter periodically carrying out the control routine in other cells in the froth flotation circuit.

The method may comprise periodically carrying out the control routine in all of the cells in the froth flotation circuit.

The method may comprise periodically carrying out the control routine in a selection of the cells in the froth flotation circuit.

The method may comprise periodically carrying out the control routine in the cells in a "rougher" bank of cells in the froth flotation circuit.

The present invention is described further by way of example only with reference to the accompanying drawings, of which:

Figure 4:
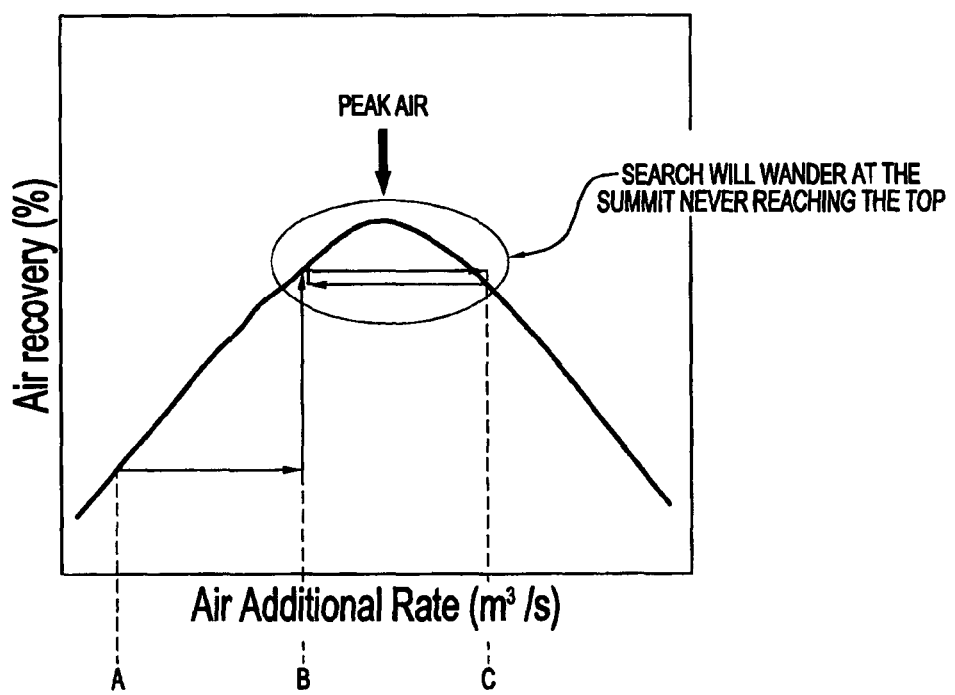
Figure 5:
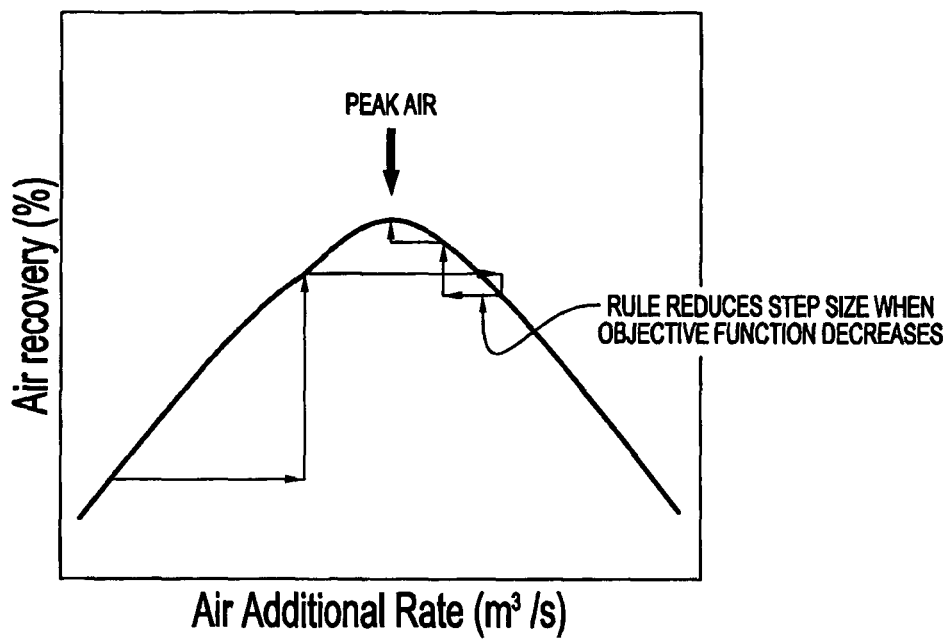
Figure 6:
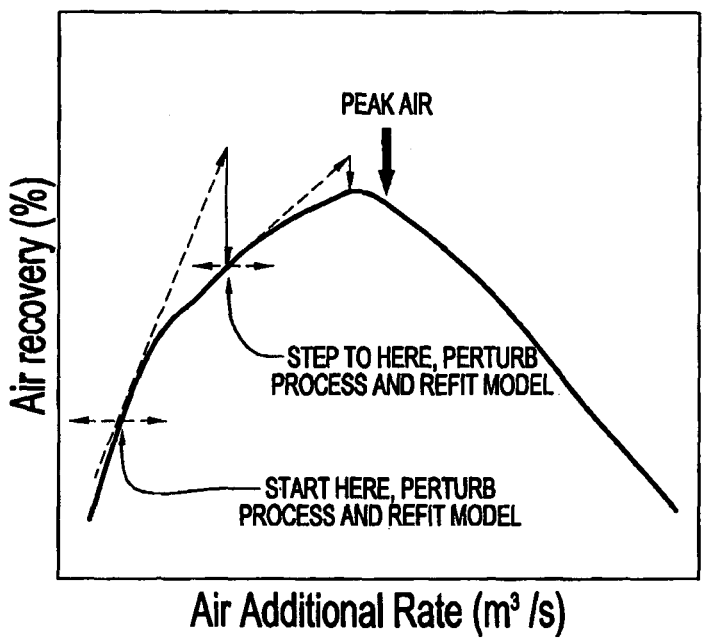
Figure 7:
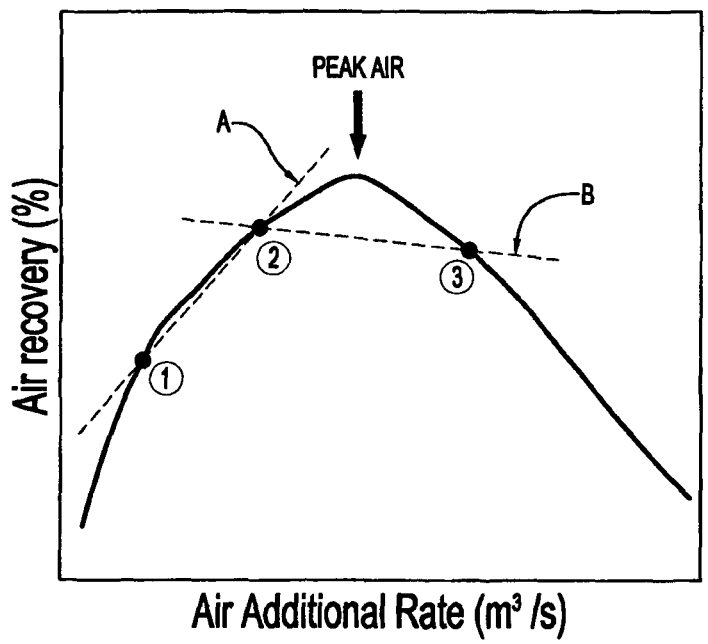
Figure 8:
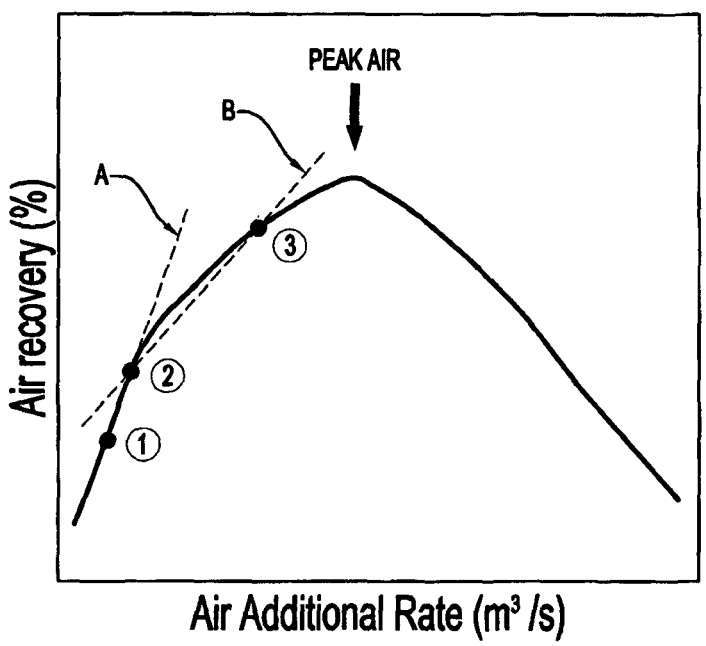
Figure 9:
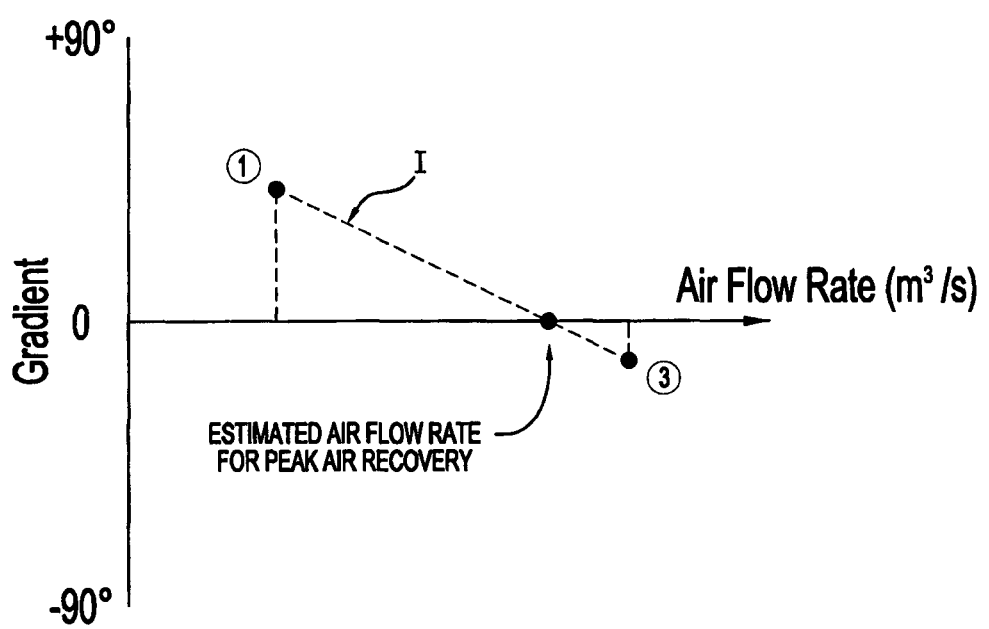

FIG. 4 is a schematic diagram that illustrates one embodiment of a method of controlling a froth flotation cell in a froth flotation circuit in accordance with the present invention that comprises periodically carrying out a control routine in the cell, with the control routine comprising making a series of step changes in the air flow rate to the cell over a selected time period and assessing air recovery at each at step change;

FIG. 5 is a schematic diagram that illustrates another embodiment of a method of controlling a froth flotation cell in a froth flotation circuit in accordance with the present invention that comprises periodically carrying out a control routine in the cell, with the control routine comprising making a series of step changes in the air flow rate to the cell over a selected time period and assessing air recovery at each at step change;

FIG. 6 is a schematic diagram that illustrates another, although not the only other, embodiment of a method of controlling a froth flotation cell in a froth flotation circuit in accordance with the present invention that comprises periodically carrying out a control routine in the cell, with the control routine comprising making a series of step changes in the air rate to the cell over a selected time period and assessing the change in air recovery at each at step change;

FIG. 7 is a schematic diagram that illustrates one form of the embodiment of a method of controlling a froth flotation cell in a froth flotation circuit in accordance with FIG. 6 that comprises calculating gradients between points on an air recovery vs. air flow rate graph to enable approximation of the air flow rate at peak air recovery;

FIG. 8 is another schematic diagram which shows another form of the embodiment of a method of controlling froth flotation cell in a froth flotation circuit in accordance with FIG. 6 with different points on the air recovery vs. air flow rate graph of FIG. 7; and FIG. 9 is a schematic diagram that illustrates a method of approximating the air flow rate for peak air recovery by using the gradients shown in FIG. 7.

Figure 1:
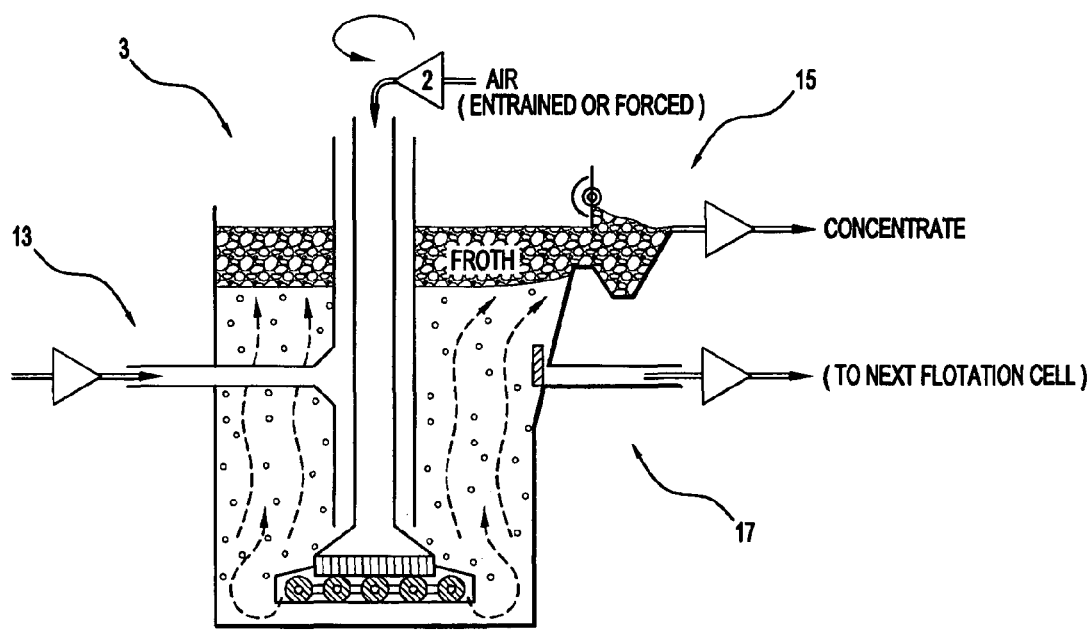
FIG. 1 is a schematic diagram of a basic froth flotation cell.
Figure 2:
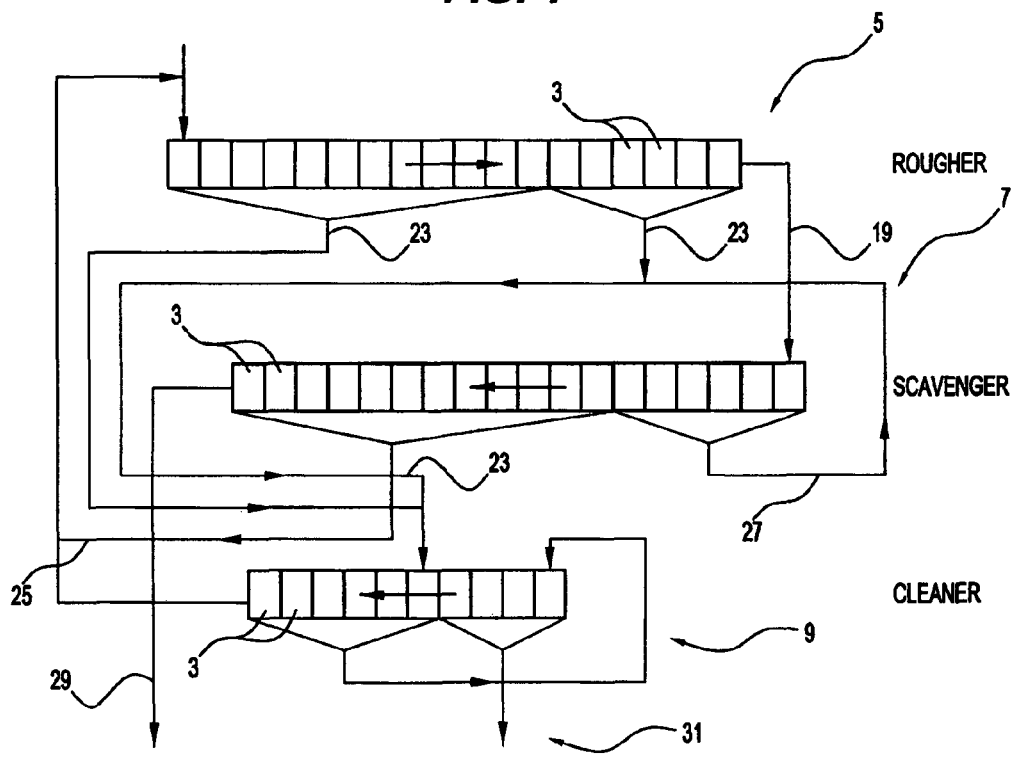
FIG. 2 is a schematic diagram of a basic froth flotation circuit which comprises a plurality of cells arranged in banks of cells.

The basic froth flotation cell and the basic froth flotation circuit shown in FIGS. 1 and 2, respectively, are conventional.

The circuit shown in FIG. 2 comprises a plurality of the cells 3 shown in FIG. 1 that are arranged in banks 5, 7, 9 of cells. The cells 3 in each bank are arranged in parallel. The cells 3 are conventional cells.

With reference to FIG. 1, each cell 3 includes (a) an inlet 13 for an aqueous slurry of particles of a feed material, (b) an outlet 15 for a froth that contains particles of a valuable material, typically a valuable metal (such as copper), entrained in a froth, and (c) an outlet 17 for tailings. It is noted that the present invention is not confined to slurries that are aqueous slurries.

The feed material to each cell 3 in the bank 5 of cells 3, which is commonly referred to as a "rougher" bank of cells, has a required particle size distribution and has been dosed appropriately with reagents to facilitate flotation (such as collectors and conditioners).

The feed material to the rougher bank 5 may be any suitable material. The following description focuses of a feed material in the form of an ore that contains valuable minerals. The valuable minerals are minerals that contain valuable material in the form of metal, such as copper. The feed material is obtained from a mined ore that has been crushed and then milled to a required particle size distribution.

The slurry of the feed material that is supplied to the cells 3 in the rougher bank 5 is processed in these cells 3 to produce froth and tailings outputs. The processing comprises introducing a suitable flotation gas, typically air, into a lower section of the cells 3. The gas rises upwardly and suitably conditioned particles of the feed material become entrained in the gas bubbles. The gas bubbles form a froth.

The froth from the cells 3 in the rougher bank 5 is transferred via transfer lines 23 to a second bank 9 of cells 3, which is described as a "cleaner" bank of cells. The froth is processed in these cells 3 in the cleaner bank 9 as described above in relation to the cells 3 in the rougher bank 5 to produce froth and tailings outputs.

The tailings from the rougher bank 5 are transferred via a transfer line 19 to a third bank 7 of cells, which is described as a "scavenger" bank of cells. The tailings are processed in these cells 3 in the scavenger bank 7 to produce froth and tailings outputs.

The froth from the scavenger bank 7 is transferred via lines 25, 27 to the rougher bank 5 and the cleaner bank 9.

The froth from the cleaner bank 9 is transferred via a transfer line 31 to downstream operations (not shown) for processing to form a concentrate.

The tailings from the scavenger bank 7 are transferred via a line 29 to waste disposal not shown.

The tailings from the cleaner bank 9 are returned via a transfer line 35 to the rougher bank 5.

Figure 3:
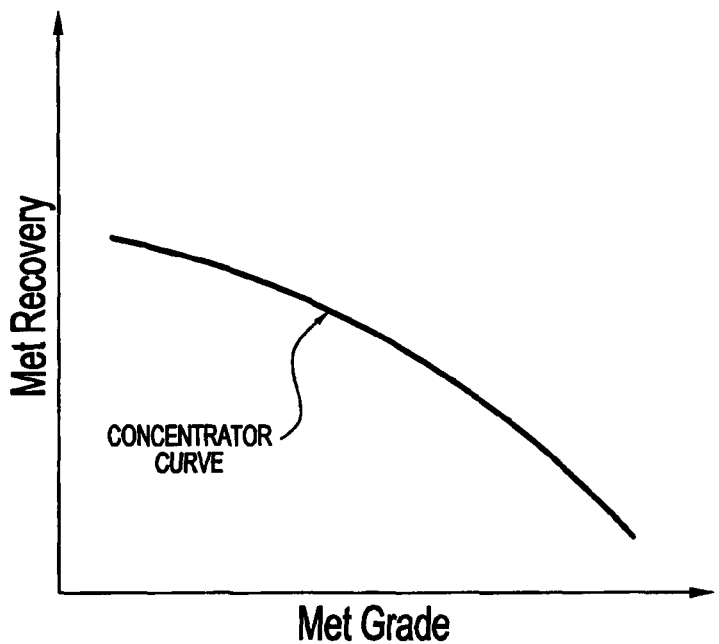
FIG. 3 is a graph of metal recovery in a concentrate versus metal grade in the concentrate which illustrates the relationship between these parameters in a typical flotation cell.

The graph of metal recovery in a concentrate from a froth flotation circuit versus metal grade in the concentrate in FIG. 3 illustrates the relationship between these parameters in a typical circuit. The Figure shows that in a typical froth flotation circuit for a valuable material, in this case a valuable metal, recovery of the valuable metal in the concentrate decreases as the metal grade in the concentrate increases. Generally, the metal recovery can be increased by operating froth flotation cells at lower froth depths in the cells. Generally, operators want the highest possible grade concentrate and the highest possible recovery, where recovery is defined as the proportion of the copper that is in the concentrate compared to the total amount of copper in the feed material. In practice, in many situations, product grade in a concentrate in a plant is relatively fixed because of downstream processing constraints and it is desirable to be able to maximise the recovery for a given grade.

In general terms, the present invention is a method of controlling at least one froth flotation cell in a froth flotation circuit that comprises periodically carrying out a control routine that ensures that the cell operates at maximise froth stability, the control routine comprising changing the gas flow rate to the cell in a series of steps and assessing the froth stability at each gas flow rate and continuing the step changes in the gas flow rate until the froth stability is a peak froth stability or is within a predetermined range of the peak froth stability of the cell.

The schematic diagram of FIG. 4 illustrates one embodiment of the method of the present invention in a froth flotation cell, for example of the type shown in FIG. 1, in which the flotation gas is air. In this embodiment, froth stability is assessed by assessing the air recovery of the cell. The present invention is not limited to assessing froth stability via air recovery and extends to any options for assessing froth stability. Other options include, by way of example, assessing bubble collapse rate in froth in the cell and bubble coalescence rate in froth in the cell.

The method shown in FIG. 4 assesses where a cell is in terms of peak air rate during the course of operating the cell.

The method of the FIG. 4 embodiment comprises periodically carrying out a control routine that comprises making a series of step changes in the air flow rate to the cell over a selected time period and assessing air recovery at each step change and repeating these steps until the air recovery at an air flow rate of a step is the peak air recovery or close to the peak air recovery, with the selection of each air flow rate being based on whether previous air flow rates resulted in an increase or a decrease in the air recovery.

FIG. 4 illustrates one sequence of steps, shown in a plot of air recovery versus air flow rate for the cell.

More particularly, the method comprises the following series of steps in a control routine:

(a) measuring the air recovery (or another parameter that is indicative of froth stability) at a current air flow rate "A", (b) increasing the air rate to the cell to air flow rate "B", (c) measuring the air recovery at air flow rate "B" and assessing whether the air recovery has increased or decreased at this air flow rate, (d) given that there was an increase in air recovery at air flow rate "B" compared to air flow rate "A", increasing the air flow rate to air rate "C", (e) measuring the air recovery at air flow rate "C" and assessing whether the air recovery has increased or decreased at this air flow rate, (f) given that there was no increase in air recovery at air flow rate "C" compared to air flow rate "B", reducing the air flow rate to air rate "B", (g) measuring the air recovery at air flow rate "B" and assessing whether the air recovery has increased or decreased at this air flow rate, and (h) repeating the steps until there is substantially no change in the air recovery with successive changes in air flow rate, which indicates that the air recovery is at or close to the peak air recovery.

The amount of the increase or decrease of the air flow rate to the cell may be the same or may vary in successive steps of the control routine. For example, the amount of the increase or decrease may be reduced as the difference between the air recoveries in successive steps decreases.

The above control routine may be carried out at any suitable time during the operation of the cell. For example, the control routine may be carried out when there is a substantial change in a selected input to the cell or a selected output from the cell. For example, the control routine may be carried out if there is a significant change in the mineralogy of the feed material or the particle size distribution of the feed material.

In general terms, the steps of the embodiment of FIG. 4 may be described by the following search algorithm:
(a) measure the air recovery at a current air flow;
(b) make either a ± step in the air flow rate,
(c) has the air recovery increased (after allowing time for the cell to stabilise)?
(d) if yes, make a step change in the air flow rate in the same direction as the previous change.
(e) if no, make a step change in the air flow rate in the opposite direction as the previous change,
(f) go to step (c), and
(g) repeat steps until there is substantially no change in the air recovery with successive changes in air flow rate, which indicates that the air recovery is at or close to the peak air recovery.

The embodiment of the method shown in FIG. 5 is similar to the embodiment of the method shown in FIG. 4 in that the control routine that is carried out periodically during the operation of the cell comprises measuring air recovery at a series of different air flow rates and selecting successive air flow rates based on the change of the air recovery at previous air flow rates.

The FIG. 5 embodiment is a more complex version of the FIG. 4 embodiment. The FIG. 5 embodiment adapts the flow rate step size based on local topology and uses other heuristic information. The control routine is not a fixed specification algorithm as described above in relation to the FIG. 4 embodiment but a more general approach that provides an opportunity to control the air flow rate to be closer to the peak air flow rate for a cell.

An example of some heuristic rules that could be used in the control routine is as follows:
(a) IF the feed grade in the output of a cell has increased at a given air flow rate when compared to the feed grade at a previous lower air flow rate, THEN restart the control routine with an increase in air flow rate.
(b) IF the feed grade in the cell output has decreased at a given air flow rate when compared to the feed grade at a previous lower air flow rate, THEN restart the control routine with a decrease in air flow rate.
(c) IF the air recovery for the cell has decreased at a given air flow rate when compared to the air recovery at a previous lower air flow rate, THEN reduce the air flow rate step size by a predetermined percentage, such as 70%.

The embodiment of the method shown in FIG. 6 is different in a key respect to the embodiments of the methods shown in FIGS. 4 and 5. The key difference is that the method of the FIG. 6 embodiment assesses different gradients between sets of points on an air flow (addition) rate versus air recovery graph. The method is based on the understanding that the gradient of a tangent at the peak air recovery will be approximately zero.

Having at least two gradients on the graph provides information to enable an estimate of the air flow rate at peak air recovery.

In general terms, the steps of the method may be described by the following search algorithm:
(a) measure the air recovery at a current air flow (point 1 on FIG. 7 and FIG. 8);
(b) make either a ± step in the air flow rate,
(c) measure the air recovery at the new air flow rate (point 2 on FIG. 7 and FIG. 8);
(d) calculate the gradient (gradient A in FIG. 7 and FIG. 8) in the change in air recovery over the change in air rate between the two points (1,2);
(e) make another + or − step in the air flow rate;
(f) measure the air recovery at the new air flow rate (point 3 on FIG. 7 and FIG. 8);
(g) calculate the gradient (gradient B in FIG. 7 and FIG. 8) in the change in air recovery over the change in air rate between the two points (2,3)
(h) use the two gradients A, B to estimate the air flow rate at peak air recovery;
(i) optionally generate more points at air flow rates closer to the estimated air flow rate for peak air recovery, thereby to generate new gradients between sets of points with the gradients converging to zero gradient.

It must be appreciated that many more points may be taken to increase the accuracy of the prediction of the air flow rate at peak air recovery. In particular the gradients between previous sets of points may be used to predict the necessary change in air flow rate to establish a new point on the graph which forms part of a set of points having a gradient between them closer to zero.

A crude way of estimating the air flow rate at peak air recovery from two gradients is described in FIG. 9 which corresponds with the points and gradients of FIG. 7. The graph shows gradients at different points taken along the air flow rate. The gradient at point 1 is taken to be the gradient between points 1 and 2. The gradient at point 3 is taken to be the gradient between points 2 and 3. The air flow rate at peak air recovery is estimated to be the air flow rate at where line "I" drawn between the gradients of points 1 and 3 crosses the zero gradient line.

It will be understood that the above description of estimating the air flow rate at peak air recovery from gradients is just one example of estimation.

The above-described embodiments are examples of a feedback control methodology, with the froth stability being assessed at given time intervals. The present invention is not limited to this example of feedback control methodology.

The above-described embodiments focus on individual cells in a froth flotation circuit comprising a plurality of such cells. The present invention also extends to froth flotation circuits per se. It can be appreciated that, if changes to the air flow rate for one cell are necessary so that the cell operates at or close to the peak froth stability for that cell, it may also be the case that changes to the air flow rates for other cells in the circuit may be required so that these cells operate at the peak froth stability for each cell. As a consequence, it may be appropriate to carry out the method of the invention on a selection or all of the cells in a circuit.

Many modifications may be made to the embodiments of the present invention described above without departing from the spirit and scope of the invention.

By way of example, whilst FIGS. 1 and 2 illustrate a particular construction of a flotation cell and a particular flotation circuit, the present invention is not so limited and extends to any suitable construction of a flotation cell and any suitable flotation circuit.

By way of example, whilst FIGS. 4 to 9 describe particular control routines for assessing gas recovery, the present invention is not limited to these particular routines.

The invention claimed is:

1. A method of controlling a froth flotation cell in a froth flotation circuit for separating substances, the method comprising carrying out an ongoing control routine to maximise froth stability during operation of the cell to ensure that froth stability is maintained at a maximum during the operation of the cell, the control routine comprising changing the gas flow rate to the cell in a series of steps and assessing the froth stability at each gas flow rate and continuing the step changes in the gas flow rate until the froth stability is a peak froth stability or is within a predetermined range of the peak froth stability of the cell, the series of steps in the control routine comprising the following steps:
   (a) assessing the froth stability at a current gas flow rate;
   (b) changing the gas flow rate to the cell,
   (c) assessing the froth stability at the changed gas flow rate and determining whether the froth stability has increased or decreased at this gas flow rate,
   (d) subject to the assessment in step (c), increasing or decreasing the gas flow rate to the cell;
   (e) assessing the froth stability at the changed gas flow rate and determining whether the froth stability has increased or decreased at this gas flow rate; and
   (f) repeating steps (b) to (d) until it becomes apparent that the froth stability is the peak froth stability or within the predetermined range of the peak froth stability of the cell.

2. The method defined in claim 1 wherein the changes in the gas flow rate in each step are based on the change of the froth stability in previous steps.

3. The method defined in claim 1 wherein the predetermined range of the peak froth stability of the cell is within 10% above or below the peak froth stability of the cell.

4. The method defined in claim 1 wherein the assessment of froth stability at each flow rate includes assessing any one or more of bubble collapse rate in froth in the cell, bubble coalescence rate in froth in the cell, and gas recovery for the cell.

5. The method defined in claim 4 wherein the assessment of froth stability at each flow rate includes assessing bubble collapse rate in froth in the cell by measuring bubble collapse rate visually or by an instrument in froth in the cell.

6. The method defined in claim 4 wherein the assessment of froth stability at each flow rate includes assessing bubble coalescence rate in froth in the cell by measuring bubble coalescence rate visually or by an instrument in froth in the cell.

7. The method defined in claim 4 wherein the assessment of froth stability at each flow rate includes assessing gas recovery via measurement of gas recovery or via measurement of other parameters that are indicative of gas recovery for the cell.

8. The method defined in claim 4, wherein the control routine is carried out to maximise gas recovery by assessing the gas recovery at each gas flow rate and continuing the step changes in the gas flow rate until the gas recovery is a peak gas recovery or is within the predetermined range of the peak gas recovery of the cell.

9. The method of claim 1 further comprising periodically carrying out the control routine to maximise froth stability during the operation of the cell.

10. The method defined in claim 9 wherein the control routine is carried out at uniform or variable time intervals during the operation of the cell.

11. The method defined in claim 9 comprises carrying out the control routine after there has been at least a minimum change in a selected input to the cell.

12. The method defined in claim 11, wherein the selected input is any one or more of the following inputs to the cell: feed rate, solids concentration in the feed, particle size distribution, pH, superficial gas velocity, chemical dosage rate, feed grade, feed type, and froth depth.

13. The method defined in claim 9 comprises carrying out the control routine after there has been at least a minimum change in a selected output of the cell.

14. A method of controlling a froth flotation circuit comprising a plurality of froth flotation cells for separating substances, the method comprising carrying out an ongoing control routine to maximise gas recovery during operation of at least one cell in the froth flotation circuit to ensure that gas recovery is at a maximum during the operation of the cell, the control routine comprising changing the gas flow rate to the cell in a series of steps and assessing the froth stability at each gas flow rate and continuing the step changes in the gas flow rate until the froth stability is a peak froth stability or is within a predetermined range of the peak froth stability of the cell, the series of steps in the control routine comprising the following steps:
   (a) assessing the froth stability at a current gas flow rate;
   (b) changing the gas flow rate to the cell,
   (c) assessing the froth stability at the changed gas flow rate and determining whether the froth stability has increased or decreased at this gas flow rate,
   (d) subject to the assessment in step (c), increasing or decreasing the gas flow rate to the cell;
   (e) assessing the froth stability at the changed gas flow rate and determining whether the froth stability has increased or decreased at this gas flow rate; and
   (f) repeating steps (b) to (d) until it becomes apparent that the froth stability is the peak froth stability or within the predetermined range of the peak froth stability of the cell.

15. The method of claim 14 further comprising periodically carrying out the control routine to maximise froth stability during the operation of the cell.

16. The method defined in claim 15 comprises periodically carrying out the control routine in a selected cell in the froth flotation circuit to maximise froth stability of the selected cell and thereafter periodically carrying out the control routine in other cells in the froth flotation circuit.

17. The method defined in claim 15 comprises periodically carrying out the control routine in all of the cells in the froth flotation circuit.

* * * * *